United States Patent

[11] 3,633,107

[72] Inventor Douglas MacPherson Brady
Middletown, N.J.
[21] Appl. No. 43,378
[22] Filed June 4, 1970
[45] Patented Jan. 4, 1972
[73] Assignee Bell Telephone Laboratories, Incorporated
Murray Hill, N.J.

[54] ADAPTIVE SIGNAL PROCESSOR FOR DIVERSITY RADIO RECEIVERS
8 Claims, 6 Drawing Figs.

[52] U.S. Cl. .......... 325/305, 325/42, 325/56
[51] Int. Cl. .......... H04b 1/16
[50] Field of Search .......... 325/41, 42, 56, 154, 301, 302, 303, 304, 305, 306; 179/15 AE

[56] References Cited
UNITED STATES PATENTS

| | | | |
|---|---|---|---|
| 3,348,150 | 10/1967 | Atal et al. .......... | 325/56 |
| 3,444,516 | 5/1969 | Lechleider .......... | 325/56 X |
| 3,537,038 | 10/1970 | Rich .......... | 325/42 X |

*Primary Examiner*—Robert L. Griffin
*Assistant Examiner*—Kenneth W. Weinstein
*Attorneys*—R. J. Guenther and Kenneth B. Hamlin

ABSTRACT: A signal processor in a diversity receiver for digital data transmitted over dispersive and fading radio channels performs the functions of demodulation, diversity signal combining, delay equalization, multipath distortion equalization and timing jitter elimination. Transversal equalizers, one in each diversity channel, are made adaptive to a common, time-varying mean-square error signal derived from the combined postdetection output data.

INVENTOR
D. M. BRADY
BY
J. P. Kearns
ATTORNEY

ADAPTIVE SIGNAL PROCESSOR FOR DIVERSITY RADIO RECEIVERS

FIELD OF THE INVENTION

This invention relates in general to diversity radio receivers for fading communication media and in particular to signal processors for such receivers which are made adaptive to digital message data.

BACKGROUND OF THE INVENTION

Long-distance radio communication in the very high-frequency (30 to 300 MHz.) bands is accomplished by ionospheric reflections. The height of the ionosphere, unfortunately, is not stationary, but rather fluctuates in random fashion. As a result, the phenomena of radio fading and multipath reception occur wherein the same signal appears to be received sequentially with varying time differentials. Somewhat the same phenomena are observed into the microwave region of the frequency spectrum (over 300 MHz.) when tropospheric transhorizon propagation is practiced, although it is believed that the fading effects at the higher frequencies are due to scattering rather than reflection.

Of the techniques employed to overcome the problem of fading in radio communication, the most widely used are based on the diversity principle. Under the diversity principle, it is assumed that each of several multipath channels conveying a given signal has independent fading characteristics. Accordingly, one or more of the diversity channels is selected on the basis of signal strength as most probably carrying a reliably detectable message signal. From a statistical standpoint less than all of the diversity channels will be in a deep fade condition, where the signal-to-noise ratio drops below zero decibel, at any given time.

Diversity channels are realized in practice by such means as spaced antennas, differently angled antennas, differently polarized antennas or multiple carrier frequencies. In general, there is no limit to the number of diversity channels that can thus be established. Furthermore, it is not necessary to select only the strongest available signal as the only reliable one. Composite signals resulting from combinations of all received signals can also be used. The channel signals may be weighted before combination, for example, in accordance with their signal-to-noise ratios with due regard to their relative phases. Conventionally, the measurements of the changing phase and amplitude of the several diversity channels are typically derived from transmitted pilot tones. Even in the presence of pilot tones, however, a major effort in instrumentation is required to achieve the correct weighting factors.

It is an object of this invention to realize in a single signal processor weighting factors based on a mean-square error criterion for digital data transmission over diversity radio channels which will equalize delay among such channels, equalize multipath distortion and substantially remove timing jitter.

It is another object of this invention to provide signal processors for diversity radio channels which are adaptive to message data.

It is a further object of this invention to effect a maximal ratio combination of diversity radio channels incidental to an adaptive equalization of such channels.

It is yet another object of this invention to apply a common error criterion to the adaptive equalization of a plurality of diversity radio channels carrying a common message data signal.

SUMMARY OF THE INVENTION

According to this invention, individual signal processors for each of a plurality of diversity radio channels conveying a phase-shift-modulated data signal are provided with a baud-interval integrator in cascade with a delay line equalizer tapped at half-baud or smaller intervals from which weighted sums of tapped outputs are obtained. The weighted sums of all signal processors associated with a given diversity radio receiver are combined and applied to a data decision circuit. A common error component derived from the difference between the combined input and quantized output of the decision circuit is then correlated with the several equalizer tap outputs to provide control signals for the weights to be applied to such tap outputs before summation. For each correlation the associated weight is adjusted in a direction to reduce the contribution of its tap to the error component. The magnitude of the adjustment can be instrumented to be either proportional or incremental.

With respect to individual signal processors the adaptation process equalizes time-varying delay and amplitude distortion of the impulse response and reduces timing jitter. Due to the half-baud or less periodic tap interval the phase of the sampling signal is made noncritical. With respect to the relationships among multiple signal processors multipath delay distortion is equalized and linear maximal ratio diversity signal combining proportional to the signal-to-noise ratios of the several channels is achieved.

In the illustrative embodiment of the invention coherent quadrature phase shift modulation is assumed for the data signals in the interest of more efficient bandwidth utilization. Consequently, dual delay line equalizers are employed and complex weighting factors are derived from separately detected cophasal (inphase) and quadrature data decisions.

DESCRIPTION OF THE DRAWING

The above and other objects, advantages and features of this invention will be better appreciated by a consideration of the following detailed description and the drawing in which.

DETAILED DESCRIPTION

Figure 1:
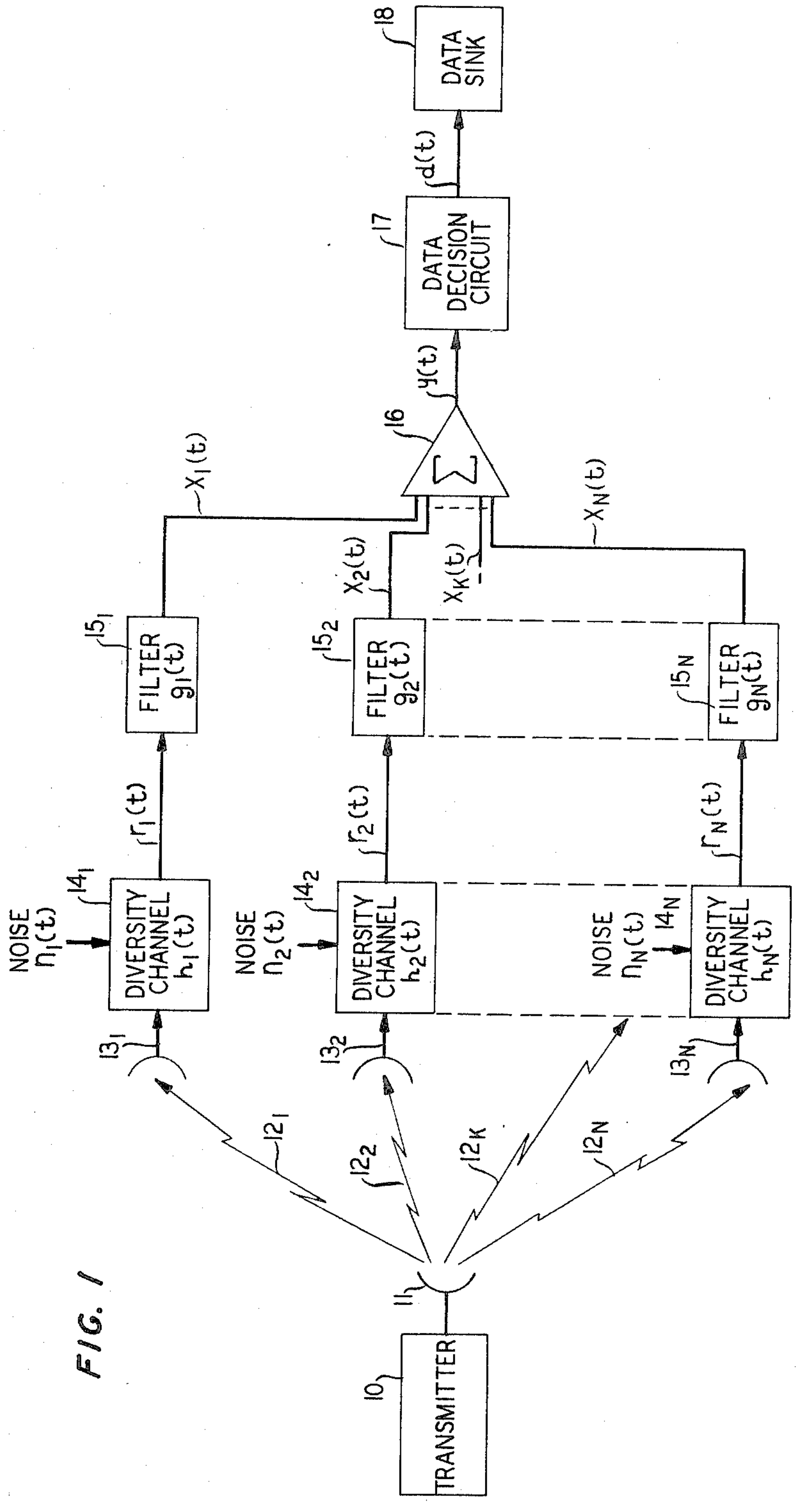
FIG. 1 is a block diagram of a representative diversity radio transmission system.

FIG. 1 illustrates a representative radio diversity system in which it is desired to transmit messages point to point between separated geographical locations. At one such location is found a transmitter 10, from which data messages, for example, originate and are modulated onto a carrier wave and radiated from antenna 11. At carrier frequencies in the microwave region such an antenna is typically a parabolic dish. Although a parabolic antenna might be expected to transmit a highly directive signal, and it does for line-of-sight distances, beyond the horizon propagation results in a scattering effect as indicated by streaks 12, representing separate radio waves. The scattering mechanism can create several paths between a point of transmission and each point of reception. The lengths of these paths are different enough to produce dispersion in time of the signal at each point of reception. A relatively small amount of dispersion will cause phase and amplitude fluctuations in each received signal. The amplitude changes are termed fading. Larger amounts of dispersion will cause multipath distortion in each received signal as well. In addition, the delay differences among the waves 12 will fluctuate. Thus, each streak 12 in FIG. 1 represents an independent, dispersive transmission path with different and fluctuating electrical lengths and attenuation characteristics.

The independent channels can be recognized in several ways, as previously mentioned. FIG. 1 shows a space diversity receiver with parabolic antennas 13 separated from each other by a few hundred yards, for example. Each receiving antenna feeds an individual demodulating receiver, which can conceptually be modelled in accordance with its impulse response characteristics. Accordingly, each channel and its receiver can be represented by a channel block 14 in cascade with a filter 15. Noise generated in the radio receivers is lumped with that included with the channel characteristic. An arbitrary *kth* diversity channel can be considered to have the output $$r_k(t)=\int_0^\infty h_k(\tau)m(t-\tau)d\tau+n_k(t) \qquad (1)$$

where $h_k(\tau)$ = impulse response of the *kth* channel,
$\tau$ = delay,
$k$ = index of channel,
$m(t)$ = transmitted data,
$n_k(t)$ = white noise component of the *kth* channel.

The problem is to obtain the best possible estimate of the transmitted signal $m(t)$ from the received data on all channels taken together. In order to accomplish this, each signal is made to traverse a linear filter 15, including demodulating facilities. Since the channel characteristics are time varying, each filter 15 must have time-varying properties. Thus, the output of each filter 15 is represented as the convolution:

$$x_k(t)=\int_0^\infty g_k(\tau)r_k(t-\tau)d\tau \qquad (2)$$

where $g_k(t)$ = the response of the *kth* filter.

While each diversity channel 14 and its receiver filter 15 convey the same message information, nevertheless none of them carries the message in a reliably detectable form continuously. Therefore, the several channel outputs $x(t)$ are combined in a linear adder 16 to obtain a composite signal $$y(t)=\sum_{k=1}^{N}x_k(t) \qquad (3)$$

Provided that less than all of the several channels drop into a deep fade at any given time, a detectable signal will always be present. The overall received signal $y(t)$ in the output of combiner 16 is operated on by decision circuit 17 to obtain output data $d(t)$ for delivery to data sink 18.

In the illustrative embodiment, it is assumed that coherent phase modulation is being used for efficient bandwidth utilization up to the order of two data bits per cycle of bandwidth. To achieve this bit rate the carrier phase is adjusted to one of four biorthogonal, i.e., each quadrature-related carrier component can assume opposite phase states, values in each baud or symbol interval of T seconds, where T is also the reciprocal of the transmission bandwidth B. Thus, two bits of information are transmitted per baud, and the equivalent bit rate becomes $2/T=2aB$ bits per second. The transmitted signal $m(t)$ can be represented as the complex low-pass equivalent of the actual transmission. This signal is $$m(t)=P_n \qquad (4)$$

where $n$ = sampling time index, and
$P_n$ is one of the four equally probable possibilities $$P_n=\pm1\pm j\ (j=\sqrt{-1}\ ) \qquad (5)$$

These data signals are encoded as opposite phases of quadrature or orthogonal components of a single carrier frequency. Thus, each of four carrier phases represents a particular pair of data bits.

At the receiver these cophasal and quadrature phasal pairs are separated and decoded individually. Typically, the radiofrequency carrier waves (in the range of 4 to 10 GHz. for troposcatter propagation) are translated to a uniform intermediate-frequency level before final demodulation.

Figure 2:
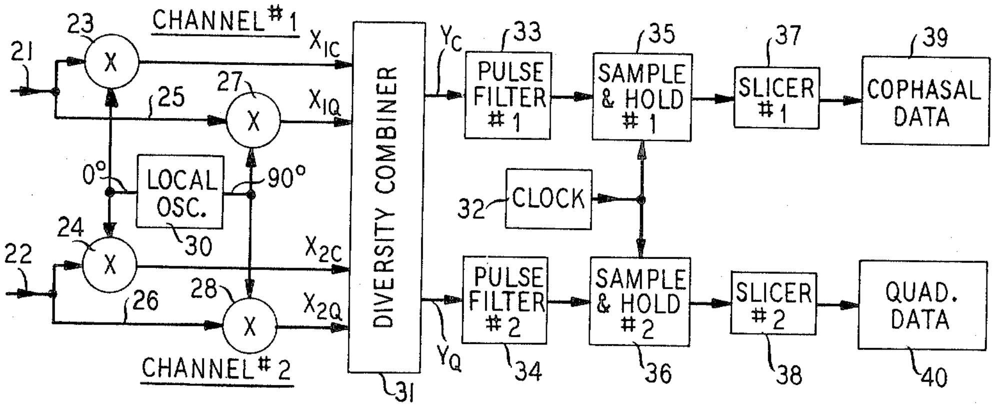
FIG. 2 is a block diagram of a dual-diversity radio receiver for the detection of quadrature phase shift data signals.

FIG. 2 illustrates the final demodulation process for a dual-diversity four-phase modulated receiver. The inputs at respective leads 21 and 22 are at intermediate frequency levels, typically at 70 MHz. A common local oscillator 30, which is assumed to be stable, has 0° and 90° outputs for separating the biorthogonal frequency pairs in product modulators 23 and 27 in one channel and 24 and 28 in the other channel. The resulting baseband signals $X_{1C}$, $X_{1Q}$, $X_{2C}$, and $X_{2Q}$ are applied to diversity combiner 31, which will be described more fully hereinafter. Subscripts "C" and "Q" refer to cophasal and quadrature phase data components. Diversity combiner 31 operates on the several inputs in such a way as to generate maximum likelihood cophasal $Y_C$ and quadrature $Y_Q$ outputs from which data decisions can be made. The vector formed by $Y_C$ and $Y_Q$ corresponds to $y(t)$ in FIG. 1.

Each of the composite product signals from diversity combiner 31 are shaped in pulse filters 33 and 34 matched to the pulse shape of the original transmitted signal. The filter outputs are in turn sampled at the baud interval and held for a corresponding time period in circuits 35 and 36. The sampling instant and holding period are determined by synchronous clock 32. Clock 32 is synchronous with the transmitter clock rate but not necessarily synchronized by it. The sampled outputs are sliced (threshold detected) in circuits 37 and 38 to reconstruct the transmitted data for delivery to respective cophasal and quadrature data sinks 39 and 40.

This invention is particularly directed to the problem of determining the optimal weighting of the input signals to the combiner as a function of time-varying channel response and also signal and noise statistics. In the presence of quadrature channel signaling and diversity reception from two or more parallel channels these weights necessarily define a complex vector space in the mathematical sense.

Let the data to be recovered be a vector quantity D, having respective cophasal and quadrature components $D_C$ and $D_Q$. Data D is to be recovered from products of the received and demodulated baseband signal X and unknown weighting factors W. Thus, $$D=WX \qquad (6)$$

Rewrite equation (6) in complex form and obtain for a single channel:

$$D=(W_C+jW_Q)(X_C+jX_Q)$$
$$=W_CX_C-W_QX_Q+j(W_CX_Q+W_QX_C) \qquad (7)$$

For multiple channels equations similar to equation (7) can be written all directed to the recovery of the same data $D$. On the assumption that the several channels are linear, then the separate equations can be combined in their real and imaginary parts.

Figure 3:
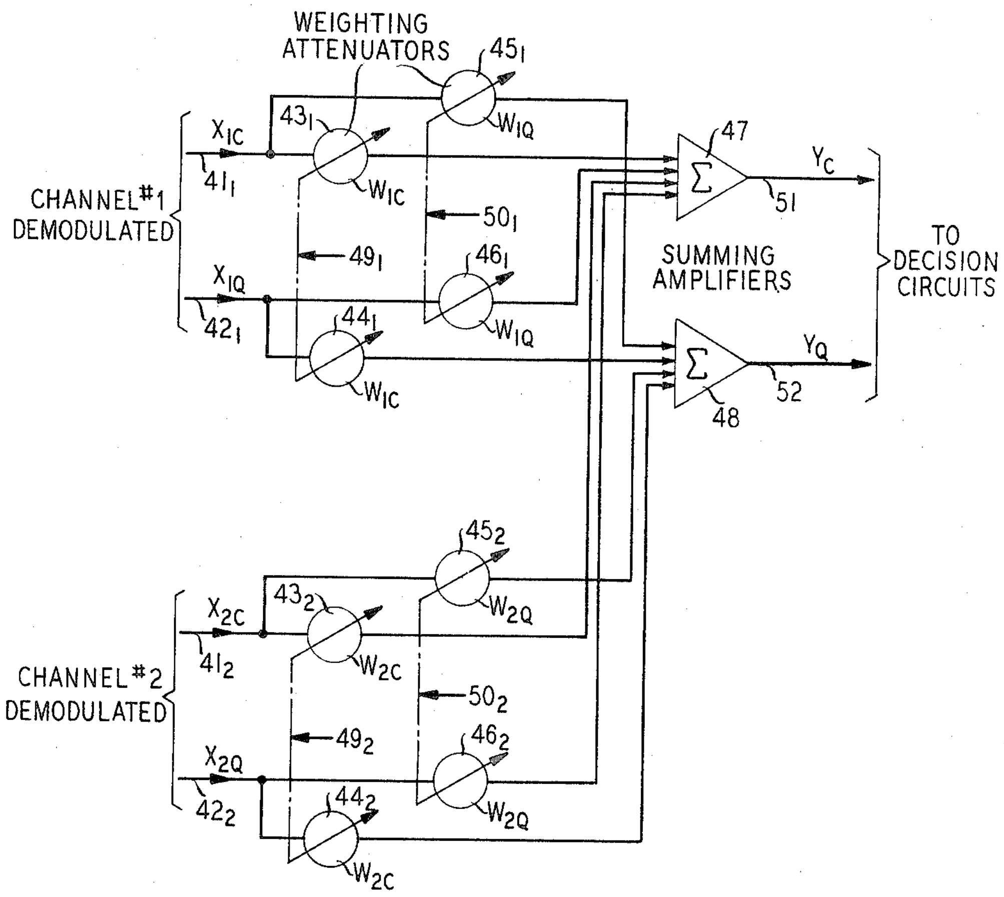
FIG. 3 is a simplified block diagram of a two-channel diversity combiner in a receiver for quadrature phase shift data signals.

FIG. 3 shows in simplified form an implementation for equation (7) extended to the dual diversity case. This implementation forms the basis for diversity combiner 31 in FIG. 2. As in FIG. 2, there are two channels of baseband data separated into cophasal and quadrature components. Channel no. 1 contains components $X_{1C}$ and $X_{1Q}$ applied at leads $41_1$ and $42_1$, while channel no. 2 contains components $X_{2C}$ and $X_{2Q}$ applied at leads $41_2$ and $42_2$. Each input signal is operated on by a pair of weighting attenuators 43–45 and 44–46. These attenuators have a range of adjustment between plus and minus unity and provide for signal inversion where necessary. Their adjustment mode may be proportional or incremental to suit the control means. Reference may be made in this connection to FIG. 9 of F. K. Becker et al. U.S. Pat. No. 3,292,110 issued Dec. 13, 1966 for an example of incremental adjustment and to E. Port U.S. Pat. No. 3,475,601 issued Dec. 29, 1969 for an example of proportional adjustment. For present purposes the fact of adjustability only is of importance. The attenuated outputs of the several attenuators are combined in a pair of summing amplifiers 47 and 48, which can advantageously be operational amplifiers. Their outputs on leads 51 and 52 are respectively the weighted products $X_CW$, and $X_QW_2$, as also found in FIG. 2.

It is readily observed that the inputs to summing amplifier 47 with respect to channels no. 1 and 2 implement the real parts (cophasal components) of equation (7), and those inputs to summing amplifier 48, the imaginary parts (quadrature components). For example, the channel no. 1 inputs to amplifier 47 are respectively input $X_{1C}$ on lead 41, weighted in attenuator $43_1$ by the factor $W_{1C}$ and input $X_{1Q}$ on lead $42_1$ weighted in attenuator $46_1$ by the factor $W_{1Q}$. The same factors with change of subscripts from 1 to 2 are applicable to channel no. 2. The analysis of the quadrature summation is similar.

FIGS. 2 and 3 illustrate in a general way the solution to the problem of combining diversity channels. However, the problem of equalizing multipath distortion remains. A transversal filter is generally used for this purpose. The transversal filter broadly comprises a tapped delay line with variable gains or weights effective at each tap.

Figure 4:
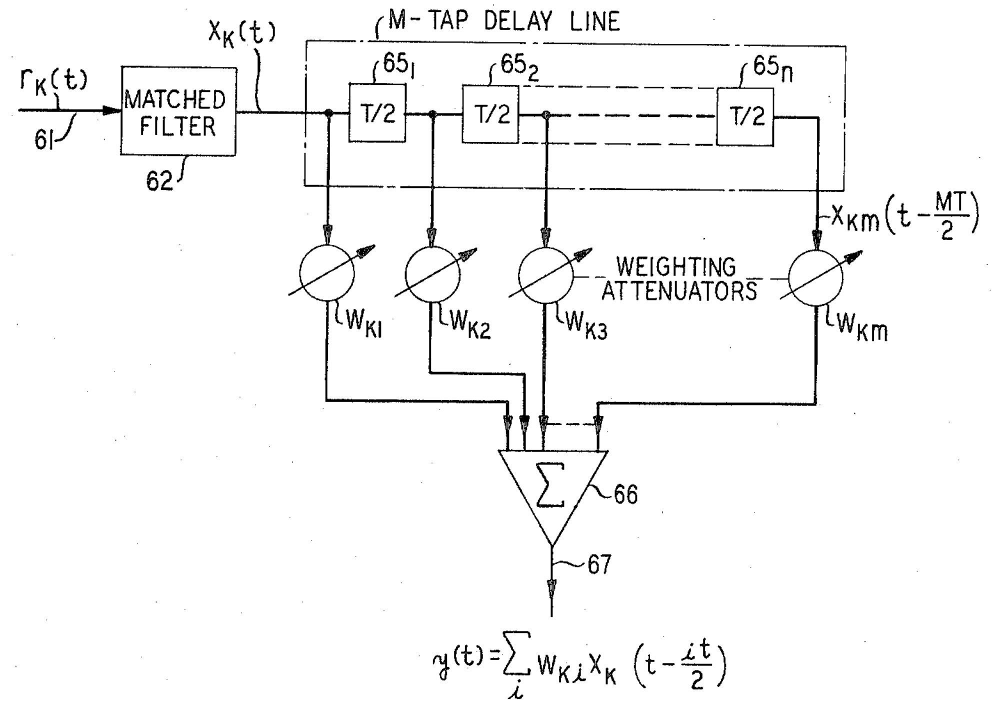
FIG. 4 is a simplified block diagram of a combined integrating and transversal filter useful as an equalizer in a single channel of a diversity radio receiver.

FIG. 4 illustrates a tapped delay line transversal filter 65 in cascade with a matched filter 62. It is generally realized that an optimum binary signal processor is a frequency-domain band-pass or low-pass filter matched to the received pulse shape followed by a tapped delay line time-domain filter with taps spaced at the baud interval of T seconds. The matched frequency-domain filter section serves to improve the signal-to-noise ratio and eliminates any channel delay which is not an integral multiple of the baud interval. The tapped delay line section mitigates intersymbol interference effects. FIG. 4 is suggested by this known arrangement but contains two significant modifications. First, filter 62 with input $r_k(t)$ at lead 61 is matched to the transmitted pulse shape rather than to the received pulse shape. The former is known and fixed, whereas the latter is unknown and time varying. Secondly, the tap spacing in transversal filter 65 is reduced to T/2 second, or other submultiple of T as is indicated in boxes $65_1$, $65_2$ and $65_N$. These modifications result in a nearly optimal filter when the tap weights $w_{k1}$ through $w_{km}$ are properly adjusted. Timing synchronization demands are reduced because of the extra samples being taken. The weighted tap outputs $x_{km}(t-(MT/2))$ are combined in linear adder 66 to generate a combined output on lead 67 in the form $$y_k(t)=\sum_i w_{ki}x_k(t-iT/2) \qquad (8)$$

where $w_{ki}$ = weighting factor for an individual attenuator of order $i$ in the *kth* diversity channel, $i$ = tap index (1....M), and $T$ = baud interval.

When the proper criterion for controlling the tap weights is employed, the received signal will be equalized with respect to attenuation and delay distortion, and the sampling instant becomes noncritical. To obtain data signals from the output of one channel as represented by equation (8) samples are taken at $T$-second intervals. The sample taken at time $nT$ is referred to as $y_n$, and $n$ is an integer. The data $d_n$ are detected by finding the complex signum function of the receiver output $$d_n = \mathrm{csgn}(y_n) = \mathrm{sgn}\,[\mathrm{Re}(y_n)]+j\,\mathrm{sgn}\,[\mathrm{Im}(y_n)] \qquad (9)$$

Figure 5:
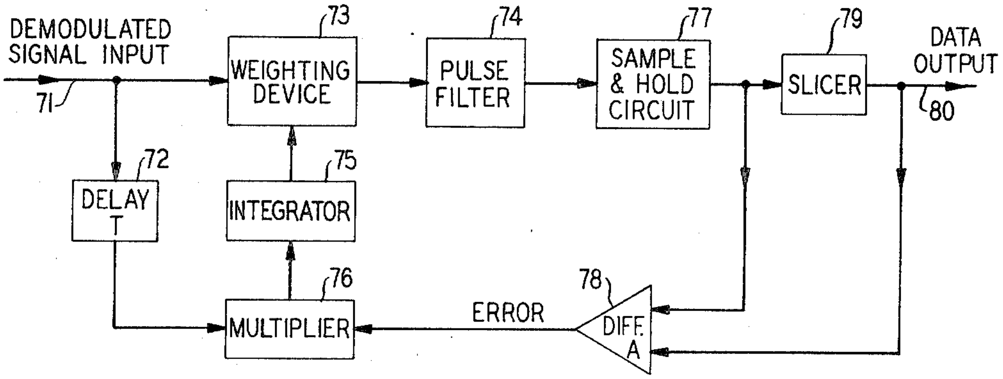
FIG. 5 is a block diagram of the control loop for tap weights in a signal processor for a radio diversity receiver according to this invention.

The problem of controlling the tap weights remains. FIG. 5 shows how a single weighting attenuator in the channel equalizer of FIG. 4 can be controlled adaptively from received data estimates. The performance objective for data transmission systems is to minimize the probability that the receiver will make an error in detecting the data. A convenient and nearly equivalent criterion for measuring performance is the minimization of the mean-square error. In the present environment the error at an arbitrary sampling instant $n$T can be defined as $$e_n=p_{n-N}-y_n, \qquad (10)$$

where $N$ = the fixed delay between transmitted and received data due to traversal of a transmission medium.

Equation (10) represents the difference between the transmitted data and the actual receiver output just prior to detection. The function to be minimized is the average of the products of the complex conjugate of the error, which is the square root of the sum of the squares of the real and imaginary parts of the complex error. Inasmuch as the receiver cannot know exactly what was transmitted, it estimates what was transmitted by slicing the analog received signal $y_n$ at each sampling instant and then uses a quantized and normalized value for each slice in place of the term $p_{n-N}$ in equation (10).

The manner in which the error given in equation (10) is applied to control weighting attenuators is determined by an algorithm, which is defined as $$\Delta W_n=Ce_n^*X_n, \qquad (11)$$

where $\Delta W_n$ = change in weight required at time $n$T, $C$ = proportionality factor, $e_n^*$ = complex conjugate of the error difference, and $X_n$ = received signal at time $n$T corresponding to a given weight.

Equation (11) is applied iteratively sample by sample. This iterative process is convergent and permits the receiver to track a slowly changing channel.

FIG. 5 implements equations (10) and (11) for a single weight. FIG. 5 comprises a delay unit 72, weighting device 73, pulse filter 74, sample-and-hold circuit 77, slicer 79, differential amplifier 78, multiplier 76, and integrator 75. At input line 71 demodulated data $X_k(t)$ is applied alike to delay unit 72 and weighting device or attenuator 73. Weighting device 73 may lie at some arbitrary setting or may be initially set to a reference value, such as zero. Device 73 multiplies the input signal to form a product which is shaped in pulse filter 74, which may be a relatively simple RC circuit, to match the transmitted pulse. Since the overall receiving filter is linear, the order in which the pulse filter and transversal filter are placed is immaterial. Pulse filter 74 is equivalent to matched filter 62 in FIG. 4. The output of the pulse filter is sampled at baud intervals in sample-and-hold circuit 77 and stored for that interval before quenching. During the holding period slicer 79 is operative to determine the polarity of the sample $y_n$ at its input to produce an output data estimate $d_n$ on line 80. The difference between the input and output of slicer 79, taken in difference amplifier 78, implements equation (10) and constitutes the error component to be minimized. The product of this error with the received signal delayed in unit 72 to compensate for the inherent delay in pulse filter 74 is in effect a correlation of these two quantities which is proportional to the magnitude of the change in weight required to minimize the contribution to the error difference by the signal on lead 71 and has a polarity indicating the direction of the adjustment. In order to smooth out the changes required in the weights at every sample the output of multiplier 76 is averaged by integration in integrator 75. Integrator 75 may comprise either a long-time constant network with a continuous output or a counter with fixed positive and negative overflows.

It will be understood that the quantities in equation (11) are complex. Accordingly, it may be expanded to show its real and imaginary parts separately in correspondence with respective cophase and quadrature components. Thus, $$\Delta W_n=C[(e_C-je_Q)(X_C+jX_Q)]$$
$$=C[(e_CX_C+e_QX_Q)+j(e_CX_Q-e_QX_C)] \qquad (12)$$

Figure 6:
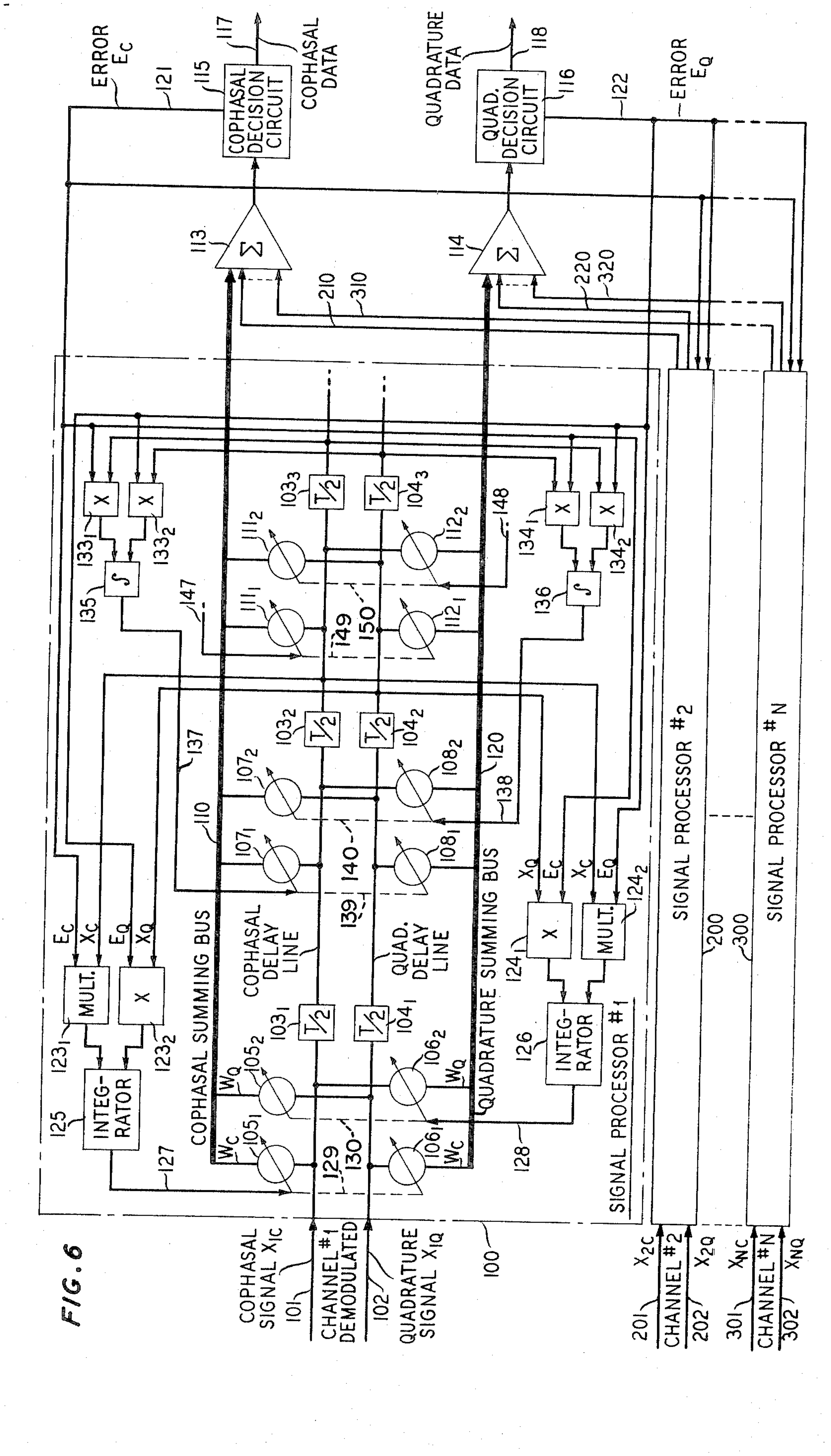
FIG. 6 is a schematic block diagram of a diversity combiner and equalizer for a multichannel diversity radio receiver for phase-shifted digital data according to this invention.

FIG. 5 illustrates the principle of equations (11) and (12). FIG. 6 shows an adaptive signal processor for a diversity radio system with more than two receiving channels and including four-phase coherent binary data. In FIG. 6 three adaptive signal processors 100, 200 and 300 are shown. Processors 200 and 300 are identical to processor 100. Consequently, only processor 100 is shown in detail. The inputs to all three (or more) processors have been reduced to baseband and separated into cophasal components $X_C$ on leads 101, 201 and 301 and into quadrature components $X_Q$ on leads 102, 202 and 302. Processor 100 comprises cophasal and quadrature delay lines having respective delay units $103_1$, $103_2$, $103_3$ and so forth and $104_1$, $104_2$, $104_3$ and so forth; weighting attenuators 105, 106, 107, 108, 111, 112 and so forth connected to junction points or taps between such delay units; cophasal summing bus 110; quadrature summing bus 120; summing amplifiers 113 and 114; cophasal and quadrature decision circuits 115 and 116; multipliers 123, 124, 133 and 134; and integrators 125, 126, 135 and 136. In operation the respective cophasal and quadrature baseband signals are propagated down the respective cophasal and quadrature delay lines. The time-spaced signals at the inputs and respective taps of the two delay lines are weighted by separate factors related to the cophasal error $E_C$ on lead 121 from cophasal decision circuit 115 and quadrature error $E_Q$ on lead 122 from quadrature decision circuit 116. Decision circuits 115 and 116 contain elements functionally the same as the pulse filter 74, sample-and-hold circuit 77, slicer 79 and differential amplifier 78 of FIG. 5 and clock 32 of FIG. 2. Recovered cophasal and quadrature data appear on respective output leads 117 and 118.

Due to the inherent one-baud delay of the pulse filter in the decision circuits the weighting control signal for each set of taps must result from the correlation of the received signal delayed by one-baud interval with the current error component. Thus, the control signal applied to lead 127 for the attenuators $105_1$ and $106_1$ at the input tap location on the delay lines result from the correlation of the $X_C$ signal in the output of delay unit $103_2$ and the $X_Q$ signal in the output of delay unit $104_2$ with the respective present $E_C$ and $E_Q$ error components in accordance with equation (12). The single integrator 125 combines the real-part products $E_CX_C$ from multiplier $123_1$ and $E_QX_Q$ from the multiplier $123_2$ to yield a control signal on lead 127 for weighting attenuators $105_1$ and $106_1$. The common controlling connection for attenuators $105_1$ and $106_1$ is indicated by broken line 129 for simplicity but will be understood to include appropriate individual control leads.

In a similar fashion the signal components in the outputs of delay units $103_2$ and $104_2$ are correlated as shown with the $E_C$ and $E_Q$ error components in multipliers $124_1$ and $124_2$ and integrated in integrator 126 to control over lead 128 and connection 130 and $W_Q$ attenuators $105_2$ and $106_2$ at the input delay line taps.

The development of the respective weighting control signals for attenuators 107 and 108 at the output of delay units $103_1$ and $104_1$ in multipliers 133 and 134 and integrators 135 and 136 from delayed signal components at the outputs of delay units $103_3$ and $104_3$ becomes self-explanatory in the light of the above. The respective delay lines may be extended as far to the right as necessary to compensate for the range of baud intervals over which the channel impulse response extends in accordance with known equalizer principles.

Signal processors 200 and 300 include cophasal and quadrature summing buses in the same way as processor 100. These buses have external appearances as indicated by leads 210 and 310 for the cophasal buses and 220 and 320 for the quadrature buses. Signals on buses 210 and 310 are combined with those on bus 110 in summer 113 to effect maximal ratio combining of cophasal data. Similarly, signals on buses 220 and 320 are combined with those on bus 120 in summer 114 to effect maximal ratio combining of quadrature data. The resultant cophasal and quadrature error components $E_C$ and $E_Q$ on leads 121 and 122 are multipled to respective processors 200 and 300. Thus, common error components control all the diversity channels so that the received signals in each diversity channel are equalized and brought to a common phase position for optimum detection.

While this invention has been disclosed in the context of specific illustrative embodiments, it is susceptible to many variations and modifications within the skill of the art.

What is claimed is:

1. In a digital data receiver for radio diversity channels,
   - a transversal filter equalizer in each of said channels for processing demodulated signals,
   - a plurality of taps on each of said equalizers spaced at not more than one-half the data symbol interval,
   - a plurality of weighting attenuators one for each of said taps,
   - means for combining the weighted outputs of all said equalizers,
   - means for deriving from said combined weighted output and the quantization of said output an error signal, and
   - means for correlating said error signal with each tap output to control individual attenuator weights operative at associated taps.

2. The data receiver defined in claim 1 in which said transversal equalizer comprises separate delay lines for data trains demodulated from phase-modulated quadrature-related carrier-wave components.

3. The data receiver defined in claim 1 in which said combining means includes a shaping filter matching the transmitted pulse shape.

4. The data receiver defined in claim 1 in which said deriving means comprises separate slicing means for each of two data trains demodulated from phase-modulated quadrature-related carrier-wave components.

5. The data receiver defined in claim 1 in which said deriving means comprises slicing means for producing one of two equal quantized amplitude outputs of opposite polarity for input signals respectively above or below a predetermined threshold level.

6. The data receiver defined in claim 1 in which said deriving means comprises slicing means for quantizing said output, and difference amplifier means responsive jointly to signals applied to the input and taken from the output of said slicing means to derive said error output.

7. The data receiver defined in claim 1 in which said deriving means comprises separate slicing means for each of two quadrature-related data trains, and separate differencing means in tandem with each of said separate slicing means for generated quadrature-related error signal components.

8. In combination with a tropospheric scatter synchronous data transmission system subject to signal fading and frequency dispersion,
   - a plurality of radio receiving channels each comprising
   - a pair of delay lines periodically tapped at intervals equal to the reciprocal of half the synchronous transmission rate,
   - means for applying respective cophasal and quadrature demodulated baseband channel signals to said delay lines, first and second summing buses,
   - a plurality of attenuators for connecting selectively weighted signals from respective taps on said delay lines to each of said first and second summing buses,
   - means for correlating signals at taps on each of said delay lines with quadrature-related error components, and
   - means responsive to signals from said correlating means for adjusting said attenuators to minimize said error components; and
   - said combination further comprising in common to a plurality of said channels
   - means responsive to the differences between weighted signal summations from a plurality of said first and second summing buses and normalized slices of said summations for generating said error components.

* * * * *